(12) United States Patent
Kurumizawa et al.

(10) Patent No.: US 8,523,589 B2
(45) Date of Patent: Sep. 3, 2013

(54) POWER PLUG LOCKING DEVICE HAVING A CONTROL UNIT FOR MOVING A LOCK MEMBER BETWEEN DIFFERENT POSITIONS

(75) Inventors: Naoto Kurumizawa, Aichi (JP); Toshiharu Katagiri, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 9 days.

(21) Appl. No.: 13/424,656

(22) Filed: Mar. 20, 2012

(65) Prior Publication Data

US 2012/0252250 A1 Oct. 4, 2012

(30) Foreign Application Priority Data

Mar. 29, 2011 (JP) ................................. 2011-073127

(51) Int. Cl.
*H01R 13/62* (2006.01)
(52) U.S. Cl.
USPC ........................................................ 439/304
(58) Field of Classification Search
USPC ........................... 439/304, 306–310, 312, 352
See application file for complete search history.

(56) References Cited

U.S. PATENT DOCUMENTS

| 8,075,329 B1* | 12/2011 | Janarthanam et al. ........ 439/304 |
| 8,206,172 B2* | 6/2012 | Katagiri et al. ............... 439/352 |
| 8,357,001 B2* | 1/2013 | Katagiri et al. ............... 439/304 |
| 2011/0277516 A1* | 11/2011 | Kahara et al. ..................... 70/58 |
| 2011/0281452 A1* | 11/2011 | Kurumizawa et al. ........ 439/304 |
| 2011/0287649 A1* | 11/2011 | Kurumizawa et al. ........ 439/304 |
| 2012/0238121 A1* | 9/2012 | Kurumizawa et al. ........ 439/299 |
| 2012/0238122 A1* | 9/2012 | Hirashita et al. .............. 439/304 |

FOREIGN PATENT DOCUMENTS

JP 9-161898 6/1997

* cited by examiner

*Primary Examiner* — Chandrika Prasad
(74) *Attorney, Agent, or Firm* — Greenblum & Bernstein P.L.C.

(57) ABSTRACT

When a power plug locking device moves a plate to a lock position or unlock position, the plate is rotated toward an operational end position with a power plug lock motor while the current of the motor is detected. When the plate comes into contact with a switching piece of a switching mechanism, the switching piece applies a load to the plate. When the current flowing through the motor becomes greater than or equal to a threshold, the supply of power to the power plug lock motor is stopped. Then, switching load of the switching mechanism 48 pushes and moves the disk to an operational end position (lock position or unlock position).

7 Claims, 6 Drawing Sheets

POWER PLUG LOCKING DEVICE HAVING A CONTROL UNIT FOR MOVING A LOCK MEMBER BETWEEN DIFFERENT POSITIONS

CROSS-REFERENCE TO RELATED APPLICATIONS

This application is based upon and claims the benefit of priority from prior Japanese Patent Application No. 2011-073127, filed on Mar. 29, 2011, the entire contents of which are incorporated herein by reference.

BACKGROUND OF THE INVENTION

The present invention relates to a power plug locking device that locks a power plug to an object, such as a vehicle, and prevents unauthorized removal of the power plug from the object.

Over these recent years, consumers have become conscious of environmental problems. Thus, vehicles that emit less carbon dioxide such as hybrid vehicles and electric vehicles have become popular. Such vehicles are driven by a battery-powered motor. When such a vehicle travels over a long distance and the state of charge of the battery becomes low, the battery must be charged (refer to Japanese Laid-Open Patent Publication No. 9-161898).

The charging of a battery involves an electrolytic reaction of compounds and ions in battery cells of the battery. This lengthens the charging time. Thus, when a user leaves the vehicle while the battery is being charged, someone may remove the power plug to steal electricity. Hence, locking devices have been developed to prevent unauthorized removal of the power plug from a vehicle.

Such a power plug locking device may include a pivotal hook-shaped lock arm and a movable lock bar. The lock arm is arranged on the power plug and prevents separation of the power plug from the inlet. The lock bar restricts movement of the lock arm. When the lock arm is hooked to a projection of the inlet, the lock bar is moved to above the lock arm to restrict movement of the lock arm. In this state, the lock bar locks the power plug to the inlet. From this state, by moving the lock bar away from the lock arm, the power plug becomes unlocked.

When the lock bar is electrically driven by a motor or the like, the lock bar may be actuated through current detection control. Referring to FIG. 8, current detection control, for example, measures the current flowing through the motor (load current value), estimates the motor rotation speed (load rotation speed) from the measured current value, and calculates the moved distance of the lock bar from the motor rotation speed. When the current continuously exceeds a threshold and the moved distance of the lock bar has reached a minimum required distance, the lock bar is determined as being located at a normal position and that overcurrent is flowing through the motor. Thus, the supply of power to the motor is stopped. The execution of such current detection control eliminates the need for sensors and allows for the power plug locking device to be reduced in size.

The calculation of the load rotation speed from the load current value uses a non-load rotation speed and non-load current value. The parameters use values taken under a condition in which the rotation of the motor is the slowest (e.g., ambient temperature of 85 degrees Celsius). This prevents erroneous determination of the lock bar being in a lock state when it is actually not in such a state.

However, under a condition in which the rotation of the motor is the fastest (e.g., ambient temperature of −40 degrees Celsius), the difference between the actual state and the calculated state becomes large. As shown in FIG. 9, repetition of locking and unlocking operations accumulates such differences. This results in the lock bar being determined through calculations as having reached its end position even though it has actually not reached such position. In such a case, the user may erroneously be notified that the lock bar has reached the end position.

SUMMARY OF THE INVENTION

One aspect of the present invention is a power plug locking device that prevents unauthorized removal of a power plug from an inlet. The power plug locking device includes a lock member arranged in the inlet. The lock member blocks removal of the power plug when the power plug is connected to the inlet. A drive unit moves the lock member. A control unit controls the drive unit to move the lock member from an operational start position to an operational end position. The control unit obtains positional information of the lock member. A movable mechanism mechanically moves the lock member from a usable position, which is a position before the operational end portion, to the operational end position. The control unit controls the drive unit based on the positional information to move the lock member to the usable position. The control unit stops the drive unit when the lock member reaches the usable position. The movable mechanism mechanically moves the lock member from the usable position to the operation end position.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

One embodiment of a power plug locking device according to the present invention will now be described with reference to FIGS. 1 to 7.

Figure 1:
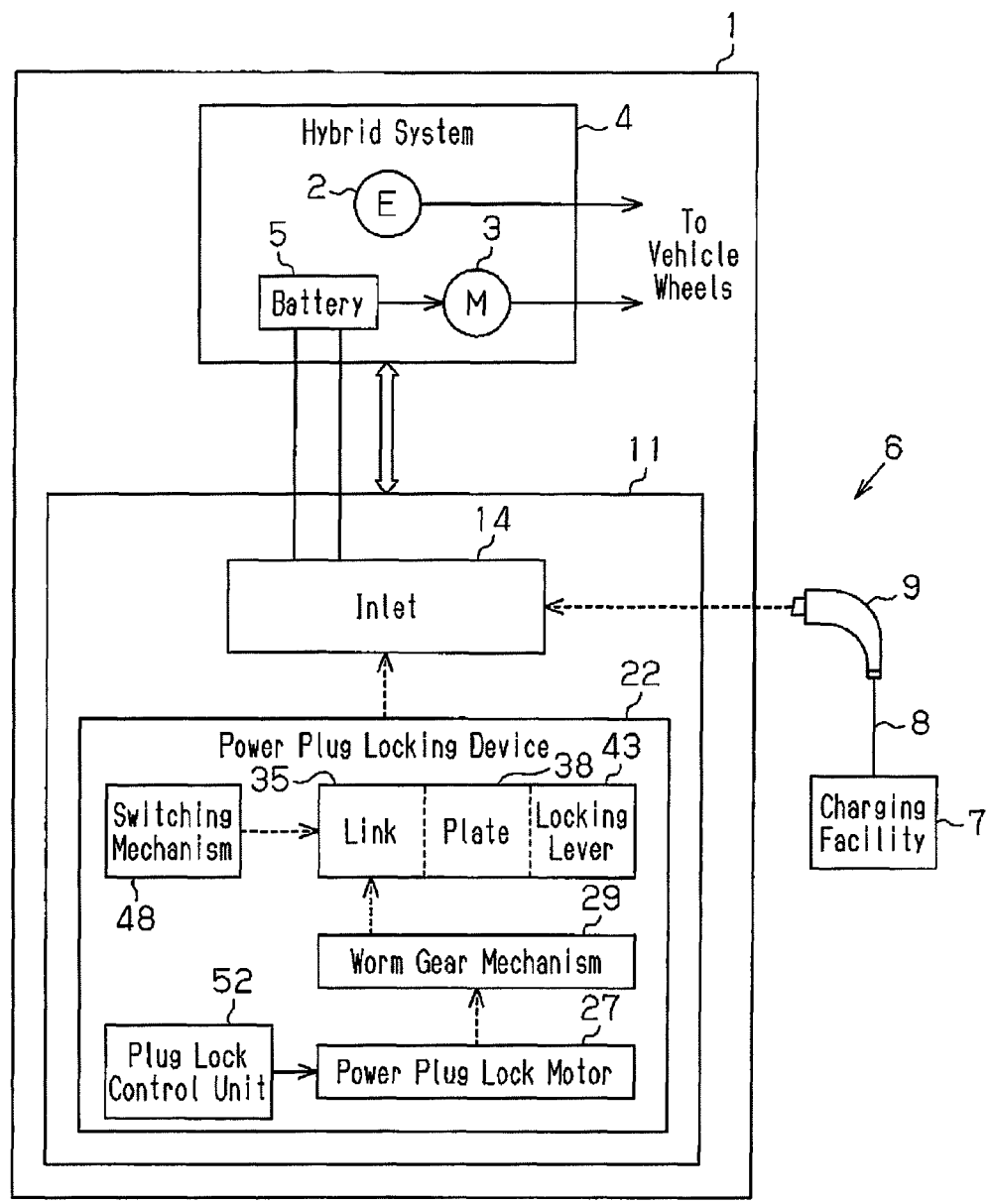
FIG. 1 is a block diagram of a power plug locking device according to one embodiment of the present invention.

Referring to FIG. 1, a hybrid vehicle 1 includes an engine 2 and a motor 3 arranged in a vehicle body 10. The engine 2 and the motor 3 form a hybrid system 4 and generate power to rotate vehicle wheels. The hybrid system 4 includes a battery 5, which serves as a power source for the motor 3. The vehicle 1 also includes a charge system 6 that charges the battery 5 with an external power supply. The charge system 6 uses a charging facility 7, such as a charging station or a residential power outlet. The charging facility 7 provides a charge cable 8 and a power plug 9, which is arranged on a distal end of the charge cable 8. The power plug 9 is connected to the vehicle 1 to charge the battery 5.

Figure 2:
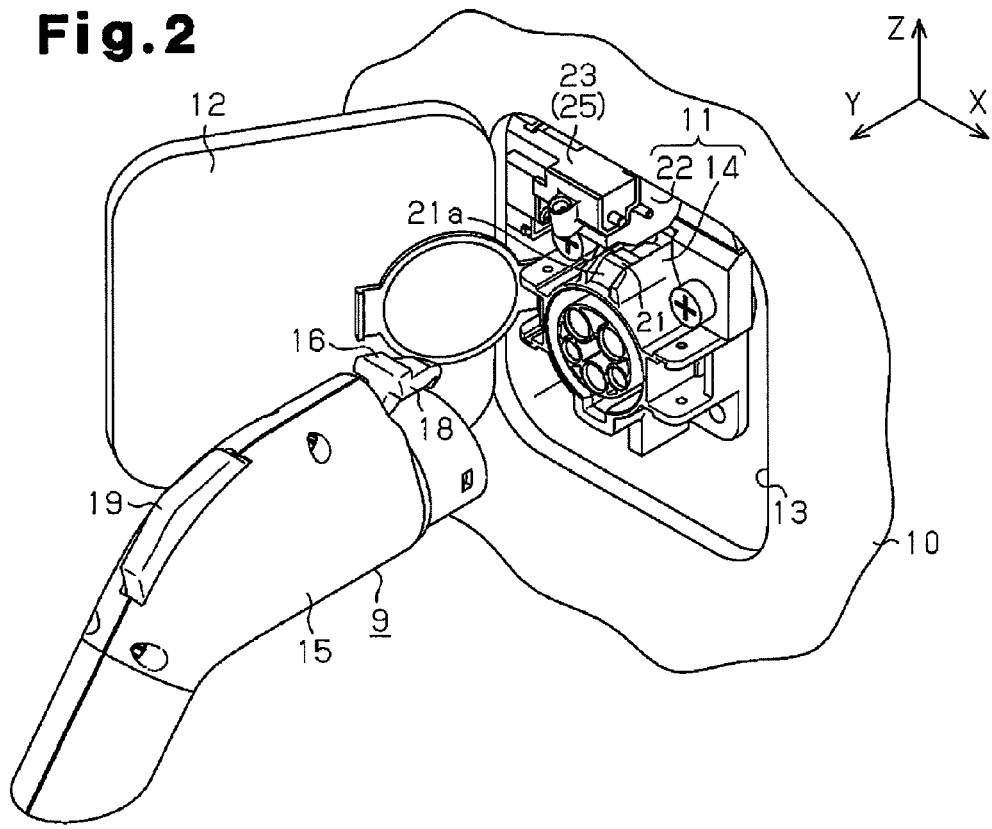
FIG. 2 is a perspective view showing a power plug and an inlet.

Referring to FIGS. 1 and 2, the vehicle body 10 includes a lid 12, which opens and closes an accommodation compartment 13. A power reception connector 11 arranged in a side wall of the vehicle body 10 is arranged in the accommodation compartment 13. The power plug 9 is connected to the power reception connector 11. The power reception connector 11 includes an inlet 14 including electric connection terminals (e.g., power terminal and control terminals).

Figure 3:
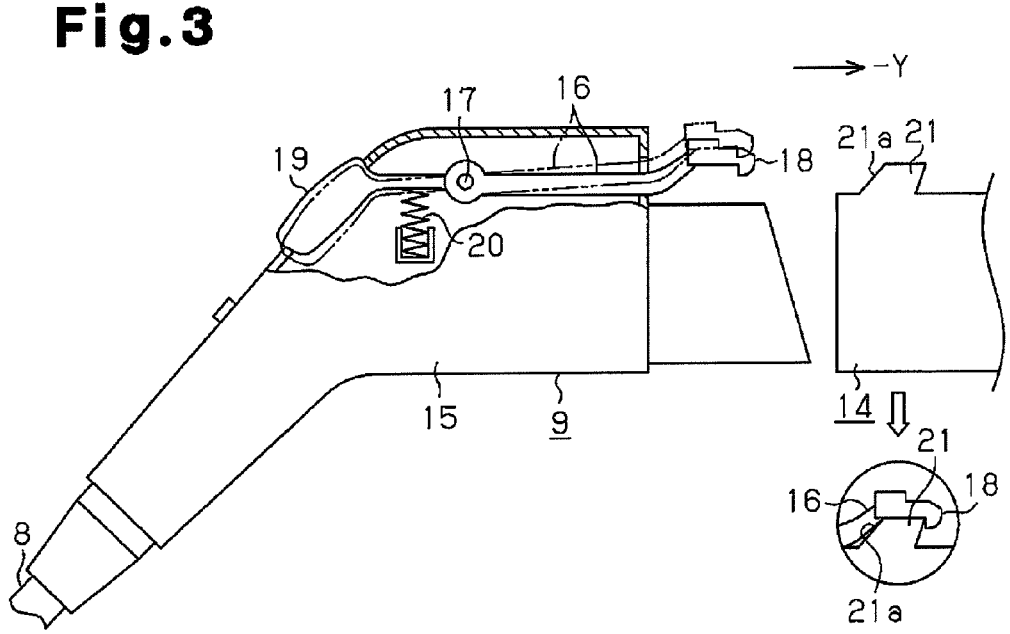
FIG. 3 is a side view showing the power plug and the inlet.

Referring to FIGS. 2 and 3, the power plug 9 is arranged in the power supply side of the charge system 6 and includes electric connection terminals connected to the electric connection terminals of the inlet 14. The power plug 9 includes a plug body 15 and a lock arm 16. The lock arm 16 is pivotally coupled to the plug body 15 to prevent separation of the power plug 9 from the inlet 14. A pivot shaft 17 pivotally supports a longitudinally middle part of the lock arm 16. The lock arm 16 includes a distal portion defining a hook 18 and a basal portion defining a lever 19. The hook 18 and lever 19 are exposed from the plug body 15. An urging member 20 is arranged near the lever 19 to constantly urge and force the lock arm 16 in a closing direction.

To connect the power plug 9 to the power reception connector 11, the power plug 9 is fitted straight in an insertion direction (-Y axis direction of FIG. 3) into the power reception connector 11. This guides and raises the hook 18 along a sloped surface 21*a* of a projection 21 on the inlet 14. When the plug 9 is completely fitted to the inlet 14, the urging force of the urging member 20 pivots the lock arm 16 and hooks the hook 18 to the projection 21. This prevents separation of the power plug 9 from the inlet 14. When determining that the power plug 9 has been completely fitted to the inlet 14, the hybrid system 4 charges the battery 5 with the power plug 9 (charging facility 7).

To remove the power plug 9 from the inlet 14 after charging is completed, the lever 19 is pushed to pivot the lock arm 16 away from the projection 21 in an opening direction. In this state, the power plug 9 is pulled straight out of the inlet 14 and removed from the vehicle 1.

Figure 4:
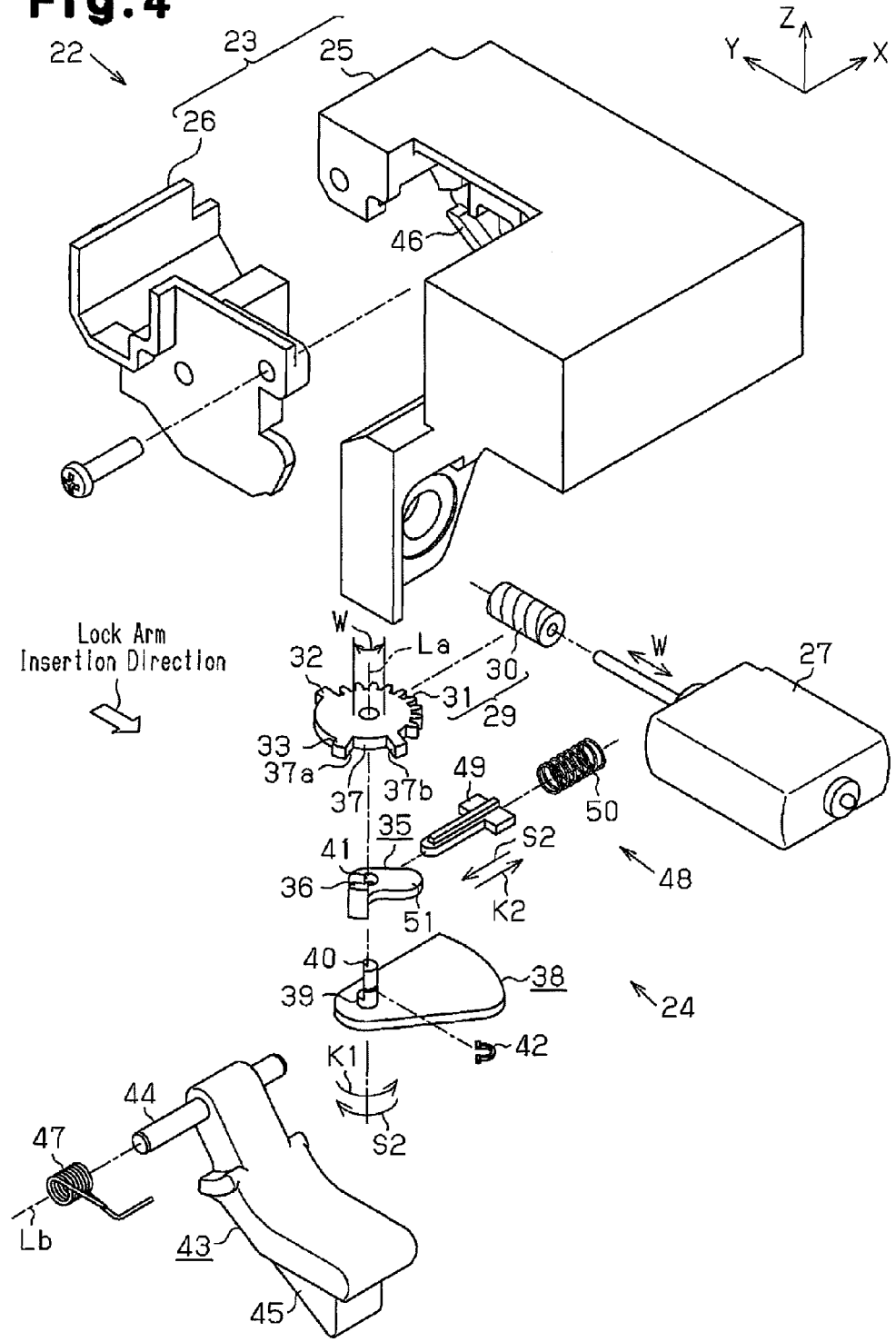
FIG. 4 is an exploded perspective view showing the power plug locking device.
Figure 5:
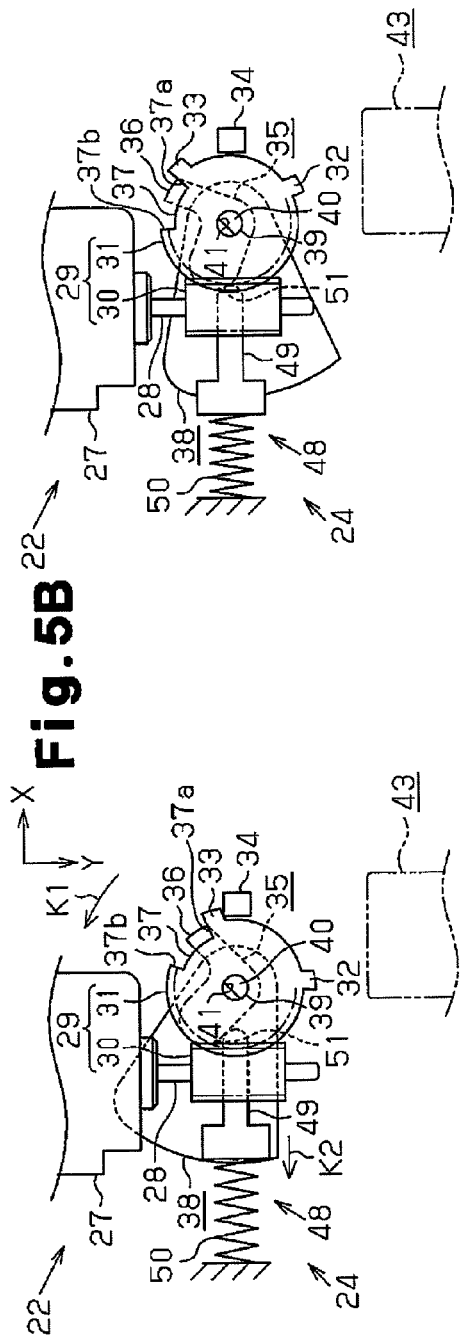
FIGS. 5A to 5D are diagrams showing the operation of the power plug locking device.

Referring to FIGS. 4 and 5, the power reception connector 11 includes a power plug locking device 22, which prevents unauthorized removal of the power plug 9 from the inlet 14. The power plug locking device 22 includes a case 23 and a lock mechanism 24, which is arranged in the case 23. The lock mechanism 24 functions as a mechanical part of the power plug locking device 22. The lock mechanism 24 of the present example is electrically actuated by a motor until a locking or unlocking operation is performed for a certain extent and then mechanically actuated by a switching load of a mechanical component.

The case 23 includes a lock body 25, which forms a main part of the case 23, and a lid 26, which closes an opening of the lock body 25. The case 23 accommodates a power plug lock motor 27, which functions as a drive source for the power plug locking device 22. The power plug lock motor 27, which may be a DC motor, is arranged so that its motor shaft 28 is arranged in a lateral direction (Y axis direction in FIG. 4) of the power plug locking device 22. The power plug lock motor 27 corresponds to a drive unit.

The motor shaft 28 is coupled to a worm gear mechanism 29, which is rotated by the power plug lock motor 27. The worm gear mechanism 29 includes a worm gear 30, which is arranged on the motor shaft 28, and a helical gear 31, which is meshed with the worm gear 30. The worm gear mechanism 29 is provided with a function that prevents the helical gear 31 from rotating the worm gear 30. That is, the worm gear mechanism 29 is provided with a self-lock function.

Two positioning tabs 32 and 33, which determine the rotational position of the helical gear 31, project from the circumferential wall of the helical gear 31. The lock side positioning tab 32 is used to position the helical gear 31 at a lock position, and the unlock side positioning tab 33 is used to position the helical gear 31 at an unlock position. Referring to FIG. 5, the positioning tabs 32 and 33 come into contact with a stopper 34, which is arranged in the case 23.

A generally plate-shaped link 35 is coupled to the helical gear 31 and supported to be pivotal about an axis La. The link 35 is overlapped with the helical gear 31 so that the axis La extends through the link 35. An engagement projection 36 extends from an edge of the link 35 in the Z axis direction of FIG. 4. The engagement projection 36 is engaged with an engagement recess 37 in a circumferential wall of the link 35. When the helical gear 31 is rotated, the engagement projection 36 comes into contact with either one of inner walls 37*a* and 37*b* of the engagement recess 37. This integrally rotates the link 35 with the helical gear 31. The link 35 is rotatable relative to the helical gear 31 for an amount corresponding to the length W of the engagement recess 37. The link 35 and the engagement recess 37 form a movable mechanism.

A triangular plate 38 is coupled to the link 35 to restrict movement of the lock arm 16. The plate 38 is pivoted in synchronism with the link 35. A pivot shaft 39 extends from a basal portion of the plate 38 in the Z axis direction of FIG. 4. The distal end of the pivot shaft 39 includes a D-shaped engagement portion 40. A D-shaped engagement hole 41 extends through the central part of the link 35. The engagement portion 40 of the pivot shaft 39 is engaged with the engagement hole 41 of the link 35. A snap ring 42 prevents separation of the link 35 from the plate 38. The plate 38 forms a lock member. The link 35, the plate 38, and the helical gear 31 are rotatable about the same axis.

A locking lever 43, which restricts the position of the lock arm 16 in cooperation with the plate 38, is coupled to the case 23. The locking lever 43 is pivotal about an axis Lb of a shaft 44. The locking lever 43 has a lower portion defining a triangular arm contact portion 45, which contacts the hook 18 of the lock arm 16. The arm contact portion 45 is exposed from an opening 46 formed in the bottom surface of the case 23. When the power plug 9 is connected to the inlet 14, the arm contact portion 45 contacts the lock arm 16. An urging member 47, which constantly urges the locking lever 43 toward the lock arm 16, is arranged on the shaft 44.

During a locking operation, the lock mechanism 24 of the present example pushes the engagement projection 36 of the link 35 with the inner wall 37*a* of the helical gear 31 as the power plug lock motor 27 produces rotation in one direction. As a result, the lock mechanism 24 pivots the link 35 and the plate 38 in a locking direction (the direction of arrow K1 in FIG. 4) and moves the link 35 and the plate 38 to an intermediate locking portion. During an unlocking operation, the lock mechanism 24 of the present example pushes the engagement projection 36 of the link 35 with the inner wall 37*b* of the helical gear 31 as the power plug lock motor 27 produces rotation in the other direction. As a result, the lock mechanism 24 pivots the link 35 and the plate 38 in an unlocking direction (the direction of arrow S1 in FIG. 4) and moves the link 35 and the plate 38 to an intermediate unlocking portion.

The case 23 accommodates a switching mechanism 48. When the link 35 and the plate 38 reach the lock or unlock intermediate position, the switching mechanism 48 then mechanically rotates the link 35 and the plate 38 to an end position, namely, a lock position or unlock position. The switching mechanism 48 includes a switching piece 49, which pushes the link 35 in the rotating direction, and an urging member 50, which constantly urges the switching piece 49 toward the link 35. The switching piece 49 is generally T-shaped when viewed from above and includes a curved distal end. The urging member 50 is formed by, for example, a coil spring. The switching mechanism 48 forms a movable mechanism.

When the link 35 is rotated from the unlock position to the lock position or from the lock position to the unlock position, a curved pushing portion 51 of the rotated link 35 pushes the switching piece 49 in the direction of arrow K2 in FIG. 4 against the urging force of the urging member 50. This accumulates force in the urging member 50. As the pushing portion 51 starts to move off the switching piece 49, the urging force of the urging member 50 forces the switching piece 49 toward the link 35 in the direction of arrow S2 in FIG. 4. Then, the switching piece 49 pushes the pushing portion 51 and rotates the link 35 and the plate 38 toward the lock position.

When the plate 38 reaches the lock position and is arranged above the locking lever 43, upward pivoting of the locking lever 43 is restricted. Here, the power plug locking device 22 is in a lock state. When the plate 38 reaches an unlock position and is separated from the locking lever 43, upward pivoting of the locking lever 43 is permitted. Here, the power plug locking device 22 is in an unlock state.

Referring to FIG. 1, the power plug locking device 22 includes a plug lock control unit 52 that controls the locking and unlocking operation of the power plug locking device 22. The plug lock control unit 52 is formed by, for example, an integrated circuit (IC). The plug lock control unit 52 controls the power plug lock motor 27 and rotates the plate 38 to switch the power plug locking device 22 between the lock and unlock states. The plug lock control unit 52.

The plug lock control unit 52 detects the current of the power plug lock motor 27 to perform a locking or unlocking operation. The plug lock control unit 52 measures the current flowing through the power plug lock motor 27, estimates the motor rotation speed from the measured current value, and calculates the moved distance of the plate 38 (link 35) from the motor rotation speed (estimated value). When the current continuously exceeds a threshold and the moved distance of the plate 38 has reached a minimum required distance, the plug lock control unit 52 determines that the plate 38 is located at a normal position and that overcurrent is flowing through the power plug lock motor 27. Thus, the plug lock control unit 52 stops the supply of current, or power, to the power plug lock motor 27. When the current continuously exceeds the threshold but the moved distance of the plate 38 has not reached the minimum required distance, the plug lock control unit 52 determines that the plate 38 is located at an abnormal position and that overcurrent is flowing through the power plug lock motor 27. Thus, after a certain time elapses, the plug lock control unit 52 stops the supply of power to the power plug lock motor 27. The motor rotation speed corresponds to an actuation amount.

In the present example, during locking and unlocking operations, the link 35 moves over the switching piece 49. This applies a load on the power plug lock motor 27 and increases the load flowing to the power plug lock motor 27. At this point of time, the plug lock control unit 52 determines that the value of the current flowing through the power plug lock motor 27 has become greater than or equal to the threshold and stops supplying current to the power plug lock motor 27. The link 35 and the plate 38 are subsequently rotated by the switching load of the switching mechanism 48 to move the plate 38 to the lock position or unlock position.

The operation of the power plug locking device 22 will now be described with reference to FIG. 5. When the power plug locking device 22 is in the unlock state shown in FIG. 5A and the plug lock control unit 52 receives a lock trigger, the plug lock control unit 52 controls the power plug lock motor 27 to produce rotation in one direction (e.g., forward direction) and start the locking operation. This rotates the helical gear 31 in the locking direction (the direction of arrow K1 in FIG. 5A) and then pushes the inner wall 37a of the helical gear 31 with the engagement projection 36 of the link 35. As a result, the helical gear 31, the link 35, and the plate 38 rotate integrally in the locking direction. Further, the pushing portion 51 of the link 35 pushes the switching piece 49 and inwardly moves the switching piece 49 straight in the direction of arrow K2 in FIG. 5A.

Referring to FIG. 5B, during the locking operation, when the link 35 moves over or moves off the switching piece 49, the load applied to the power plug lock motor 27 becomes the largest. This increases the current flowing through the power plug lock motor 27. Thus, the plug lock control unit 52 determines that the current has become greater than or equal to the threshold and stops supplying power to the power plug lock motor 27. Inertial force then continues to rotate the link 35.

Referring to FIG. 5C, when the link 35 moves off the switching piece 49, the lock side positioning tab 32 comes into contact with the stopper 34 and prevents further rotation of the helical gear 31. At this point of time, the helical cannot be further rotated in the locking direction, and only the link 35 and the plate 38 can be further rotated in the locking direction.

As the link 35 moves off the switching piece 49, the urging force of the urging member 50 pushes the link 35. As a result, the switching piece 49 moves outwardly and linearly in the direction of arrow K2 in FIG. 5C. In this manner, after the supply of power to the power plug lock motor 27 is stopped in accordance with the detected current, the switching load of the switching mechanism 48 continues to rotate the link 35 and the plate 38 to the lock position. Here, the link 35 and the plate 38 are rotated in the locking direction by an amount corresponding to the length W of the engagement recess 37.

Referring to FIG. 5D, when the engagement projection 36 of the link 35 comes into contact with the inner wall 37b of the engagement recess 37 in the helical gear 31, the rotation of the link 35 and the plate 38 is stopped. In this state, the plate 38 is arranged above the locking lever 43 and thereby restricts pivoting of the locking lever 43. As a result, movement of the lock arm 16, which is hooked to the projection 21 in the inlet 14, in the opening direction is limited. Thus, the power plug locking device 22 is in a lock state, and the power plug 9 is fixed to the inlet 14.

Figure 6:
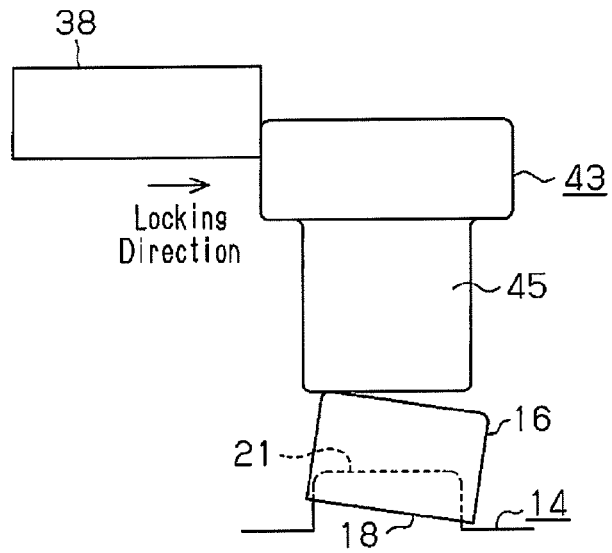
FIG. 6 is a schematic diagram showing the power plug in an incomplete hooking state.

Referring to FIG. 6, when connecting the power plug 9 to the inlet 14, the hook 18 may not be correctly hooked to the projection 21. For example, the hook 18 may become stuck and not be completely hooked to the projection 21. Such a state is referred to as an incomplete hooking state. Under such a situation, the lock arm 16 would be held above the locking lever 43. Thus, the locking lever 43 would be in the movement path of the plate 38. As a result, when the plate 38 rotates in the locking direction, the plate 38 would hit the locking lever 43. This would stop the rotation of the plate 38 before reaching the lock position.

In such a case, the lock arm 16 may be moved in upward, downward, leftward, and rightward directions to lower the hook 18 to the normal position. Then, the locking lever 43 is pivoted downward by the urging force of the urging member 47. Subsequently, the switching load restarts the rotation of the link 35 and the plate 38 in the locking direction to the lock position. In this manner, even when incomplete hooking occurs, adjustment of the lock arm 16 would allow the switching mechanism 48 to rotate the plate 38 to the normal lock position. Unlocking operations are basically performed under the same principle as locking operations and thus will not be described.

Figure 7:
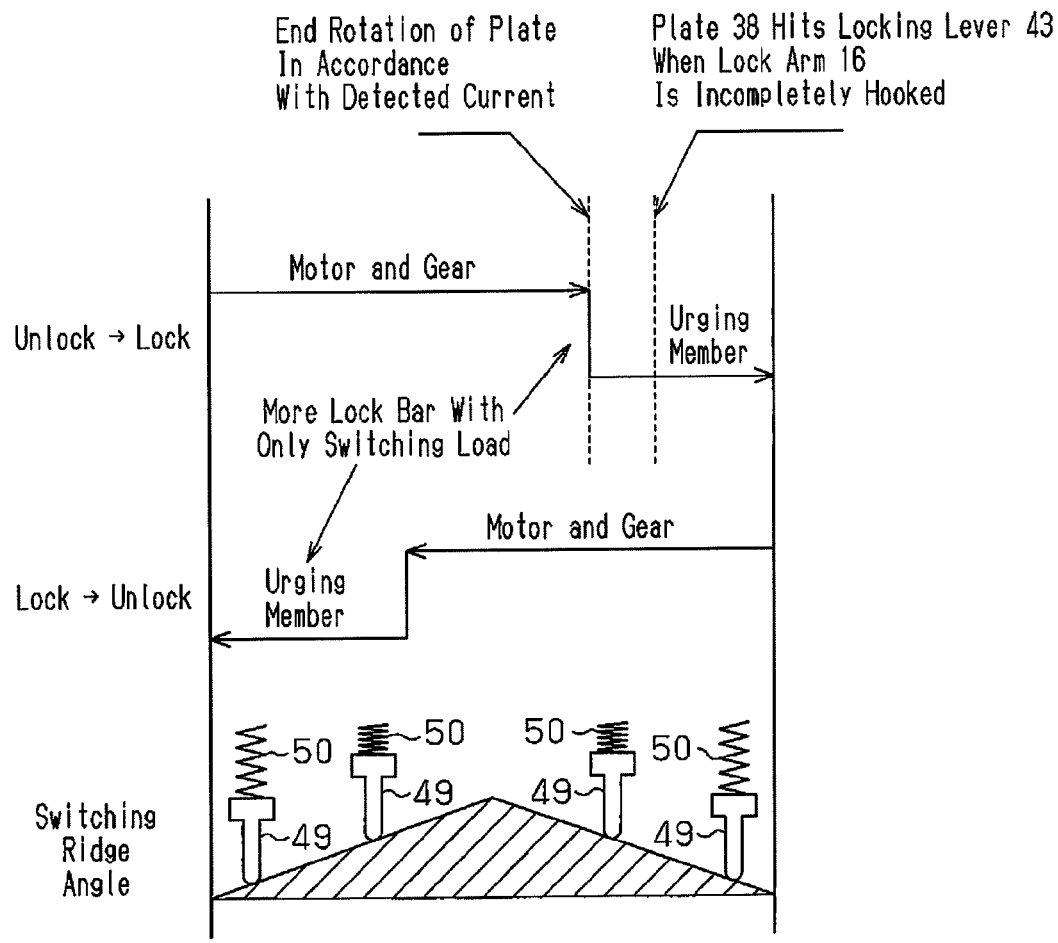
FIG. 7 is a chart illustration the operation of the power plug locking device.
Figure 8:
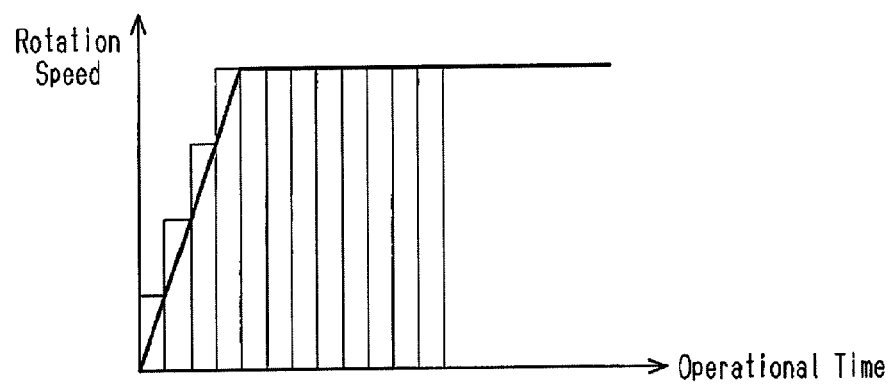
FIG. 8 is a graph illustrating current detection control.
Figure 9:
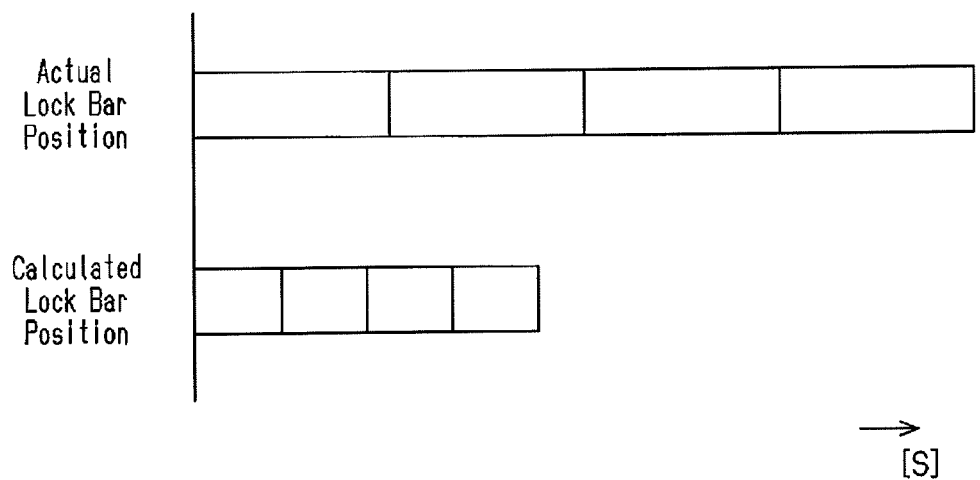
FIG. 9 is a diagram illustrating the accumulation of differences in the calculated position and the actual position.

Referring to FIG. 7, in the present example, the plate 38 is rotated while the plug lock control unit 52 detects the current of the power plug lock motor 27. After the plug lock control unit 52 stops the power plug lock motor 27 in accordance with the detected current, the switching load of the switching mechanism 48 moves the plate 38 to its end position, which is the lock position or unlock position. Thus, in an incomplete hooking state, the timing at which the plate 38 would hit the locking lever 43 is later than the timing at which the current detection stops the rotation of the plate 38 with the power plug lock motor 27. This allows for adjustment of the lock arm 16 before the plate 38 hits the locking lever 43.

After the detected current stops the rotation of the plate 38 with the power plug lock motor 27, the plate 38 is forcibly moved to its end position. As a result, a position obtained by the plug lock control unit 52 (i.e., operational end determination position) conforms to the actual position of the plate 38. This avoids errors in the position of the plate 38 obtained by the plug lock control unit 52 and the actual position. Thus, even when locking and unlocking operations are repeated, errors are not accumulated. This prevents erroneous determination of the position of the plate 38.

Further, even when the plate 38 is incompletely hooked to the lock arm 16, the position of the lock arm 16 can be adjusted to resolve the incomplete hooking. Then, the switching load of the switching mechanism 48 would move the plate 38 to the lock position. This would prevent a state in which the power plug locking device 22 cannot shift to the lock state even though a locking operation is being performed.

The present embodiment has the advantages described below.

(1) The current flowing to the power plug lock motor 27 is detected to move the plate 38 to a location before the operational end position (lock position or unlock position). From this position to the operational end position, the switching load of the switching mechanism 48 mechanically moves the plate 38. This conforms, or initializes, the position of the plate 38 obtained by the plug lock control unit 52 with the actual position. Thus, errors do not occur between the calculated position and the actual position.

(2) Even when the lock arm 16 is in an incomplete hooking state, as soon as the incomplete hooking state is resolved, the switching load of the switching mechanism 48 moves the plate 38 to the lock position. This ensures that the locking operation is performed.

(3) The power plug lock motor 27 only needs to move the plate 38 to an intermediate position. This shortens the time during which the power plug lock motor 27 is supplied with power and thereby reduces power consumption.

It should be apparent to those skilled in the art that the present invention may be embodied in many other specific forms without departing from the spirit or scope of the invention. Particularly, it should be understood that the present invention may be embodied in the following forms.

When moving the plate 38 to the intermediate position, the current detection does not necessarily have to be performed. For example, a timer may be used so that the plate 38 is moved to a predetermined position by supplying a motor with power until a certain time elapses.

A motor operational trigger (lock trigger or unlock trigger), when cooperating with the door lock of a vehicle, may be a current or voltage supplied to a door lock motor or a switch signal output when a dedicated operation member is supplied.

The lock member does not have to be of a rotational type and may be of a linear type that moves straight.

The lock mechanism 24 is not limited to the structure of the above embodiment and may be modified. For example, the plate 38 may directly restrict movement of the lock arm 16 in the opening direction.

The lock mechanism 24 may be such that it shifts to a lock state when the locking lever 43 is fitted into a receptacle of the power plug 9.

The driving means is not limited to a motor and may be, for example, a solenoid.

The movable mechanism is not limited to the switching mechanism 48 and may be a different mechanical mechanism.

The concept of the present example may be applied to just either one of the locking side and unlocking side.

The vehicle 1 is not limited to a hybrid vehicle and may be, for example, an electric vehicle driven by only a motor.

The power plug locking device 22 is not limited to the vehicle 1 and may be applied to other devices or apparatuses.

The present examples and embodiments are to be considered as illustrative and not restrictive, and the invention is not to be limited to the details given herein, but may be modified within the scope and equivalence of the appended claims.

The invention claimed is:

1. A power plug locking device that prevents unauthorized removal of a power plug from an inlet, the power plug locking device comprising:
   a lock member arranged in the inlet, wherein the lock member blocks removal of the power plug when the power plug is connected to the inlet;
   a drive unit that moves the lock member;
   a control unit that controls the drive unit to move the lock member from an operational start position to an operational end position, wherein the control unit obtains positional information of the lock member; and
   a movable mechanism that mechanically moves the lock member from a usable position, which is a position before the operational end portion, to the operational end position, wherein
      the control unit controls the drive unit based on the positional information to move the lock member to the usable position,
      the control unit stops the drive unit when the lock member reaches the usable position, and
      the movable mechanism mechanically moves the lock member from the usable position to the operation end position.

2. The power plug locking device according to claim 1 further comprising:
   an urging member; and
   a switching piece urged by the urging member, wherein the switching piece pushes the movable mechanism with a switching load.

3. The power plug locking device according to claim 1, wherein the control unit calculates an actuation amount of the drive unit from a value of a current flowing through the drive unit to obtain a moved distance of the lock member from the actuation amount, and the control unit stops supplying current to the drive unit when the current value exceeds a predetermined threshold and the moved distance reaches a minimum required distance.

4. The power plug locking device according to claim 2, wherein the movable mechanism, when the lock member moves, pushes the switching piece and accumulates force in the urging member, and the movable mechanism releases the accumulated force of the urging member when the lock member reaches the usable position of the movable mechanism.

5. The power plug locking device according to claim 2, wherein the movable mechanism is formed so that the switching piece moves in a first direction and accumulates force in the urging member while contacting the movable mechanism during a first period in which the lock member moves from the operational start position to the usable position and so that the switching piece moves in a second direction, which is opposite to the first direction, while contacting the movable mechanism during a second period in which the lock member moves from the usable position of the movable mechanism to the operational end position.

6. The power plug locking device according to claim 5, wherein the movable mechanism pushes the switching piece and accumulates force in the urging member during the first period, and the accumulated force of the urging member is released during the second period.

7. The power plug locking device according to claim 1, wherein the control unit includes a timer that measures an actuated time of the lock member, and the timer stops supplying current to the drive unit when the actuated time measured by the timer reaches a predetermined time.

\* \* \* \* \*